US007109613B2

(12) United States Patent
Lui

(10) Patent No.: US 7,109,613 B2
(45) Date of Patent: Sep. 19, 2006

(54) POWER HAND TOOL

(75) Inventor: Tat Nin Lui, Aberdeen (HK)

(73) Assignee: Choon Nang Electrical Appliance Mfy., Ltd., Aberdeen (HK)

( * ) Notice: Subject to any disclaimer, the term of this patent is extended or adjusted under 35 U.S.C. 154(b) by 120 days.

(21) Appl. No.: 10/828,279

(22) Filed: Apr. 21, 2004

(65) Prior Publication Data

US 2005/0236917 A1    Oct. 27, 2005

(51) Int. Cl.
*H02K 1/32* (2006.01)
*H02K 3/24* (2006.01)
*H02K 5/00* (2006.01)
*H02K 9/00* (2006.01)

(52) U.S. Cl. .............................. 310/64; 310/83; 310/89

(58) Field of Classification Search .................. 310/64, 310/50, 83, 89, 52; 74/606 A
See application file for complete search history.

(56) References Cited

U.S. PATENT DOCUMENTS

| 2,244,406 | A | * | 6/1941 | Schonwald | 310/62 |
| 2,456,571 | A | * | 12/1948 | Turner et al. | 310/50 |
| 2,779,883 | A | * | 1/1957 | Schumann | 310/50 |
| 3,155,856 | A | * | 11/1964 | Macha et al. | 310/57 |
| 3,244,031 | A | * | 4/1966 | Mitchell | 408/128 |
| 3,252,020 | A | * | 5/1966 | Consoli | 310/64 |
| 3,294,182 | A | * | 12/1966 | Filander et al. | 173/77 |
| 3,546,502 | A | * | 12/1970 | Botefuhr et al. | 310/50 |
| 3,651,707 | A | * | 3/1972 | Rees | 74/421 A |
| 3,818,255 | A | * | 6/1974 | Wagner | 310/50 |
| 4,479,555 | A | * | 10/1984 | Grossmann et al. | 173/171 |
| 4,623,810 | A | * | 11/1986 | Smith | 310/90 |
| 5,731,646 | A | * | 3/1998 | Heinze et al. | 310/89 |
| 5,789,833 | A | * | 8/1998 | Kinoshita et al. | 310/64 |
| 6,104,112 | A | * | 8/2000 | Vanjani | 310/64 |
| 6,144,121 | A | * | 11/2000 | Ishida et al. | 310/50 |
| 6,300,693 | B1 | * | 10/2001 | Poag et al. | 310/54 |
| 6,429,559 | B1 | * | 8/2002 | Severien et al. | 310/89 |
| 6,671,931 | B1 | * | 1/2004 | Duncan | 16/435 |
| 6,700,237 | B1 | * | 3/2004 | Yang | 310/58 |

FOREIGN PATENT DOCUMENTS

GB          2050213 A  *  1/1981

* cited by examiner

*Primary Examiner*—Darren Schuberg
*Assistant Examiner*—Erik Preston
(74) *Attorney, Agent, or Firm*—Leydig, Voit & Mayer, Ltd.

(57) ABSTRACT

A power hand tool includes a body and an electric motor in the body and having a shaft for driving a connector for connecting and driving a cleaning/polishing implement. An enclosure encloses the motor for protection against intrusion of a liquid, and includes a thermally conductive end cap that is exposed outside of the body. A thermal conductor in contact with a metal casing of the motor and the end cap conducts heat from the motor to the end cap for heat dissipation.

12 Claims, 6 Drawing Sheets

POWER HAND TOOL

The present invention relates to a power hand tool for use in a wet environment.

BACKGROUND OF THE INVENTION

The electric motor of a power hand tool can become very hot during operation, and motor cooling has always been a concern. Efficient motor cooling in power hand tools for wet use is difficult to achieve because the required waterproofing arrangement inherently hinders heat transfer.

The subject invention seeks to mitigate or at least alleviate such a problem by providing a power hand tool improved in this aspect.

SUMMARY OF THE INVENTION

According to the invention, there is provided a power hand tool comprising a body and an electric motor located in the body and having a shaft for driving a connector for connecting and driving an implement, the motor having a metal casing. An enclosure encloses the motor for protection against liquid, which includes a thermally conductive part that is exposed to the exterior outside the body. Also included is a thermal conductor in contact with the motor casing and the enclosure part for conducting heat from the motor to the enclosure part for heat dissipation.

preferably, the enclosure part is situated outside the body.

It is preferred that the enclosure has an opening that is closed by the enclosure part.

In a preferred embodiment, the enclosure part is positioned in close proximity to the connector.

More preferably, the enclosure part has an apertured portion through which the connector extends from inside the enclosure.

Further more preferably, the apertured portion is tubular and supports the connector for rotation.

It is preferred that the thermal conductor is in surface contact with an end wall of the motor casing through which the motor shaft projects.

It is preferred that the thermal conductor is secured by screws to the motor casing.

It is preferred that the thermal conductor is secured by screws to the enclosure part.

In a preferred construction, the thermal conductor has a central part in contact with the motor casing and opposite side parts in contact with the enclosure part.

More preferably, the power hand tool includes a gearbox connected between the motor shaft and the connector, which is flanked by the side parts of the thermal conductor.

The invention also provides a power hand tool comprising a body and an electric motor located in the body and having a shaft for driving a connector for connecting and driving an implement, the motor having a metal casing. An enclosure encloses the motor for protection against liquid. Also included is a heat sink as at least part of the enclosure in contact with the motor casing for conducting heat from the motor within the enclosure and then dissipating the heat out of the enclosure.

BRIEF DESCRIPTION OF DRAWINGS

The invention will now be more particularly described, by way of example only, with reference to the accompanying drawings, in which.

DETAILED DESCRIPTION OF BEST MODE EMBODIMENT

Figure 1:
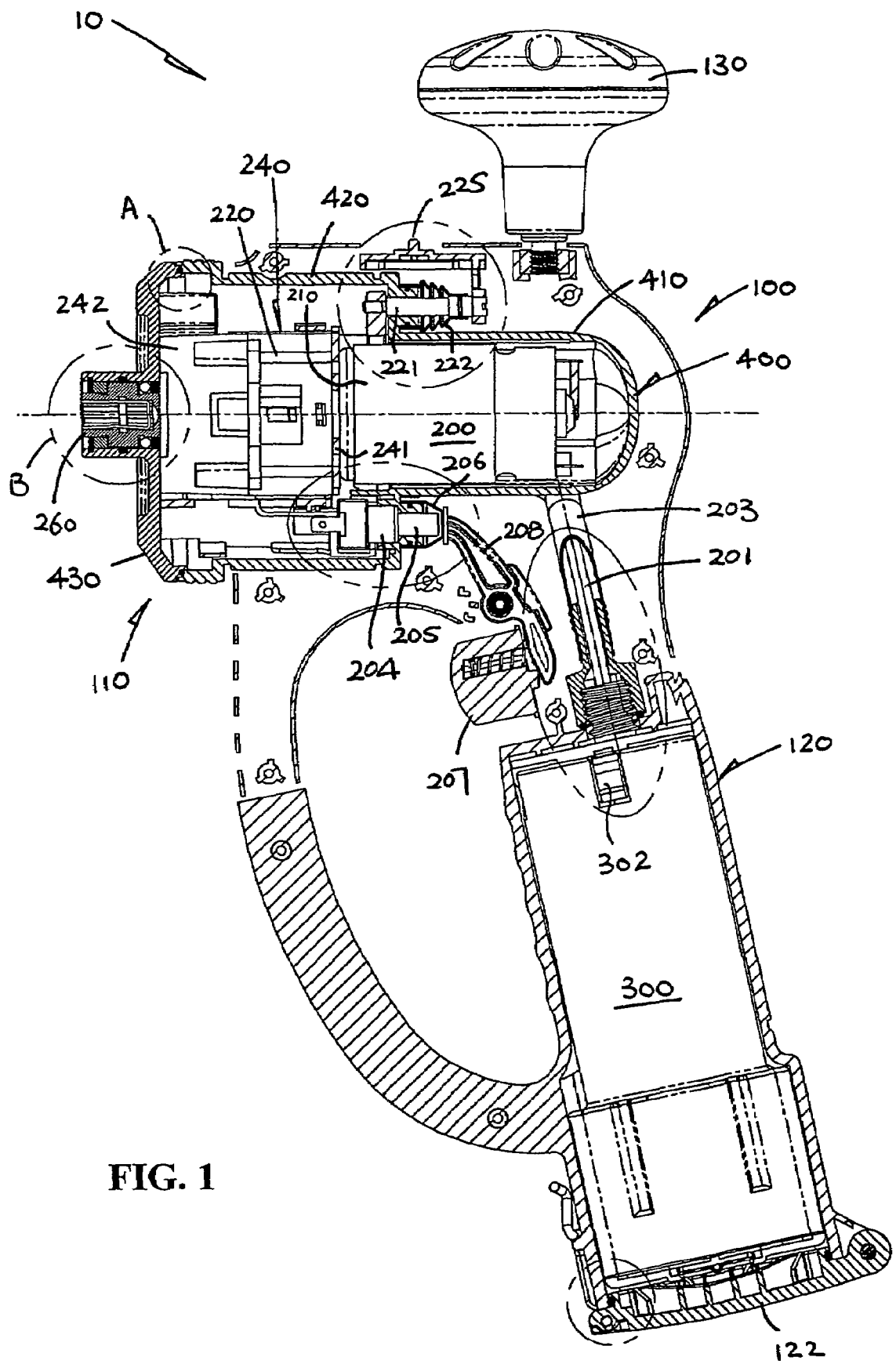
FIG. 1 is a cross-sectional left side view of an embodiment of a power hand tool in accordance with the invention.
Figure 1A:
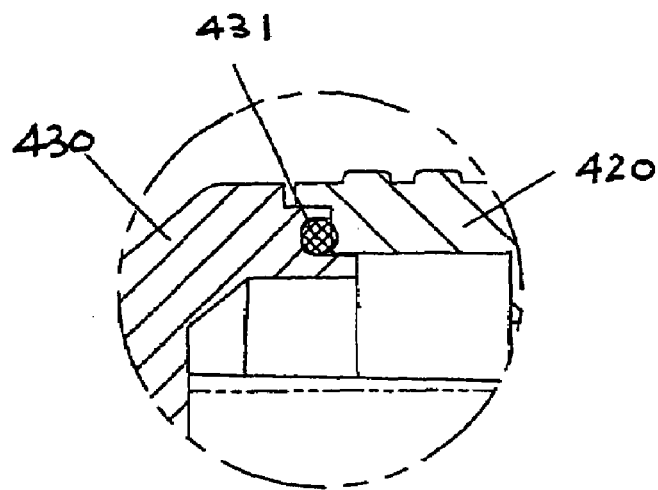
FIG. 1A is a fragmentary view showing part A of the power tool of FIG. 1 on an enlarged scale.
Figure 1B:
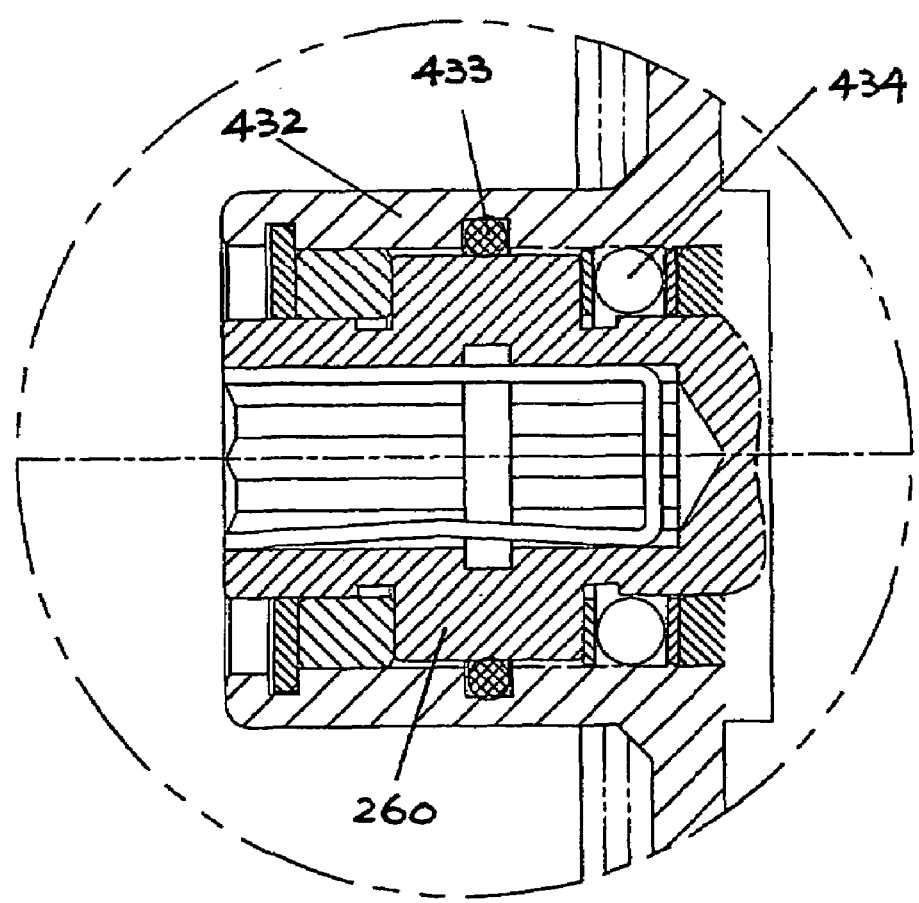
FIG. 1B is a fragmentary view showing part B of the power tool of FIG. 1 on an enlarged scale.
Figure 2:
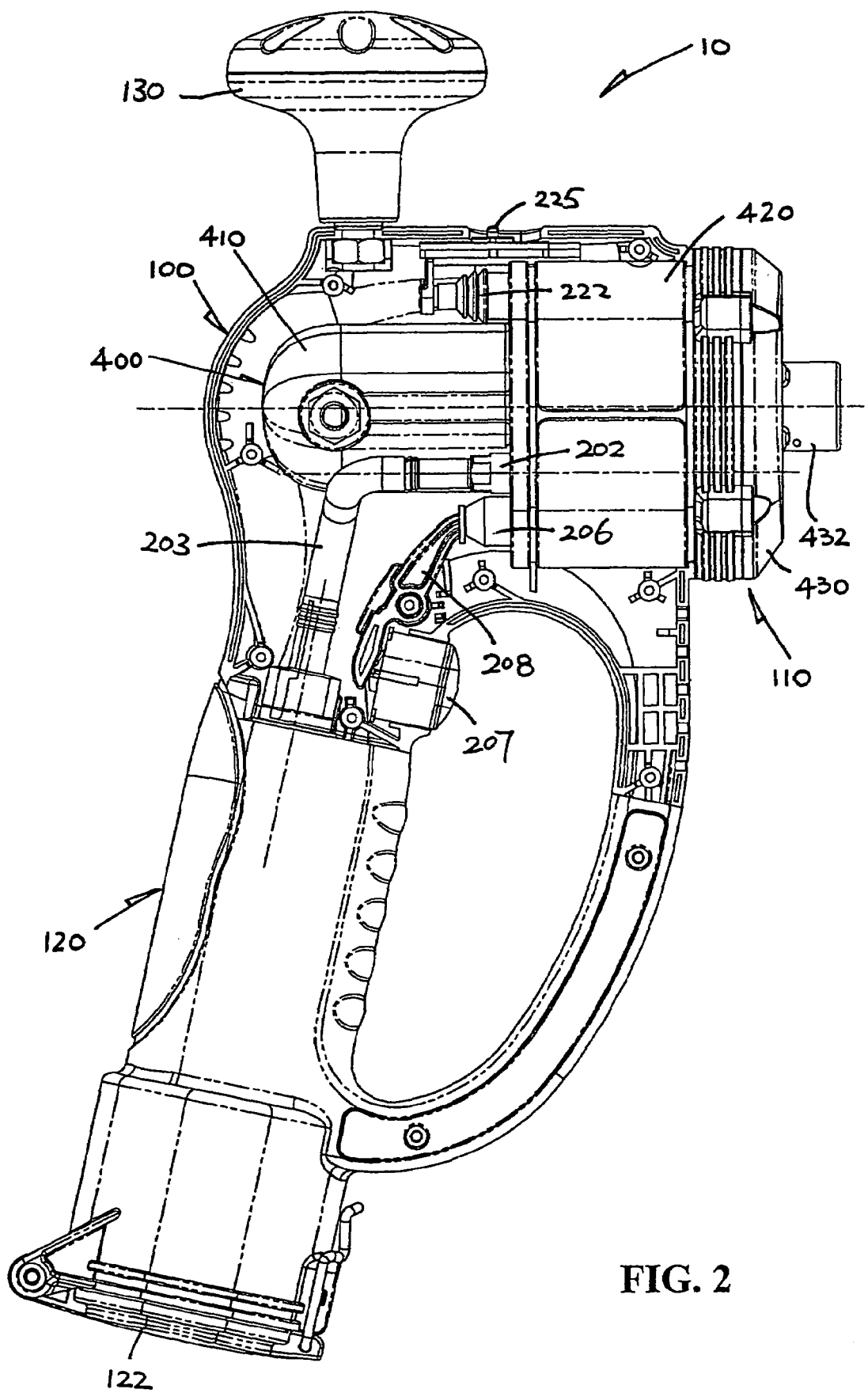
FIG. 2 is a cross-sectional right side view of the power tool of FIG. 1.
Figure 3:
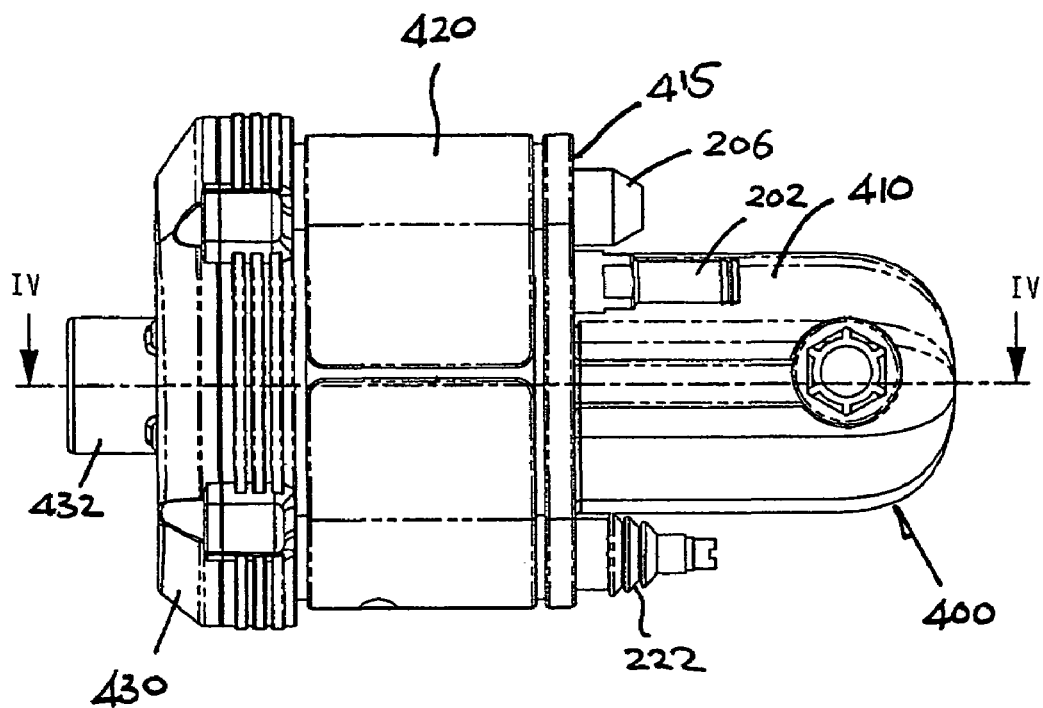
FIG. 3 is a top plan view of a motor/gearbox assembly of the power tool of FIG. 1.
Figure 4:
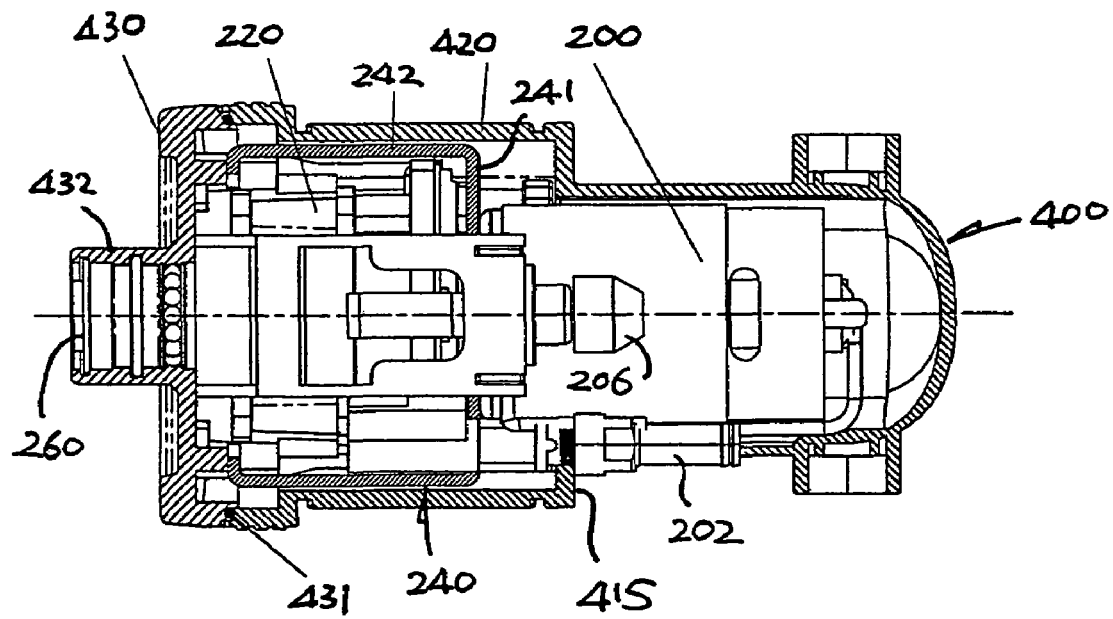
FIG. 4 is a cross-sectional view of the assembly of FIG. 3, taken along line IV—IV.
Figure 5:
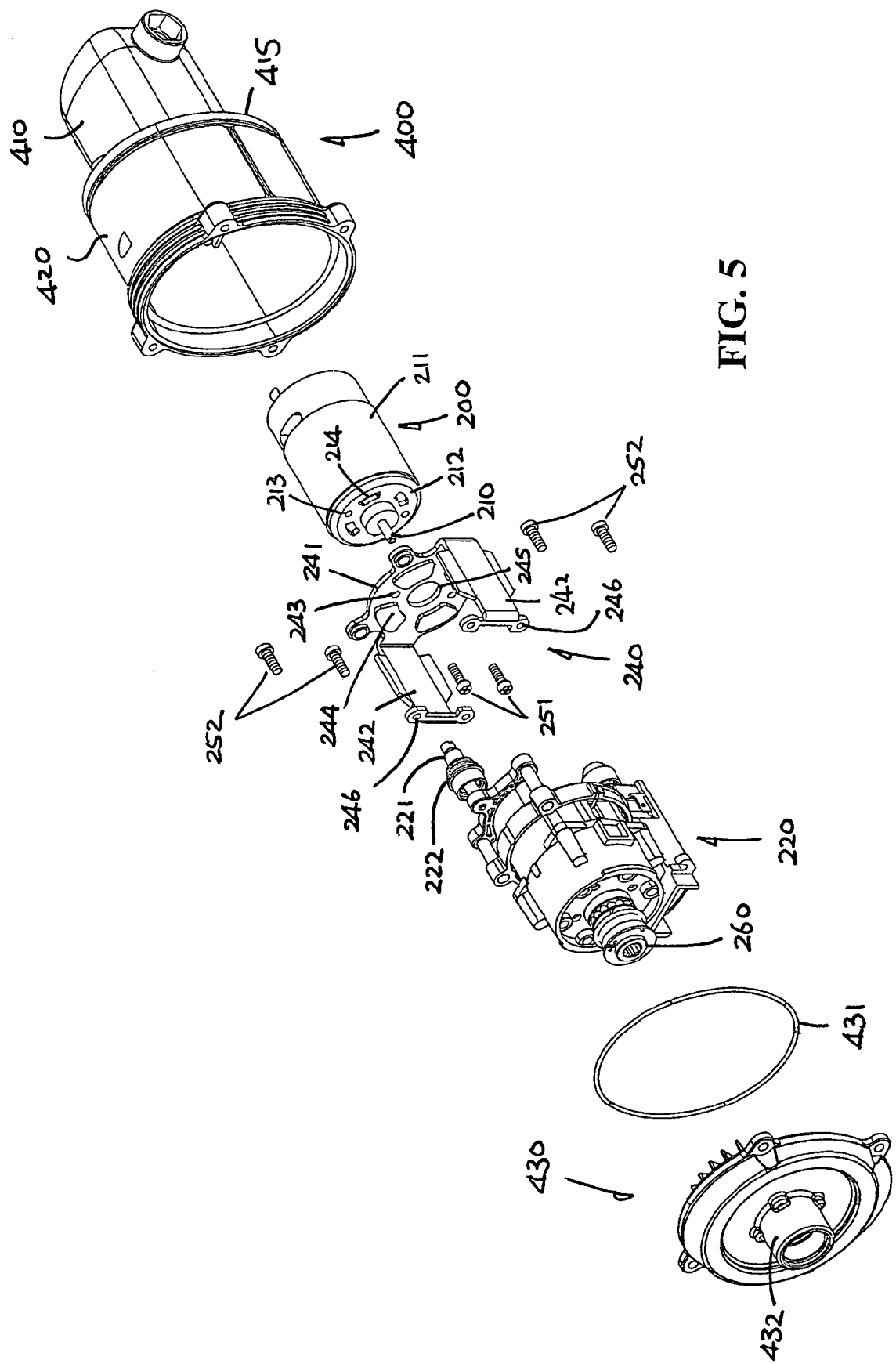
FIG. 5 is an exploded perspective view of the assembly of FIG. 3.
Figure 6A:
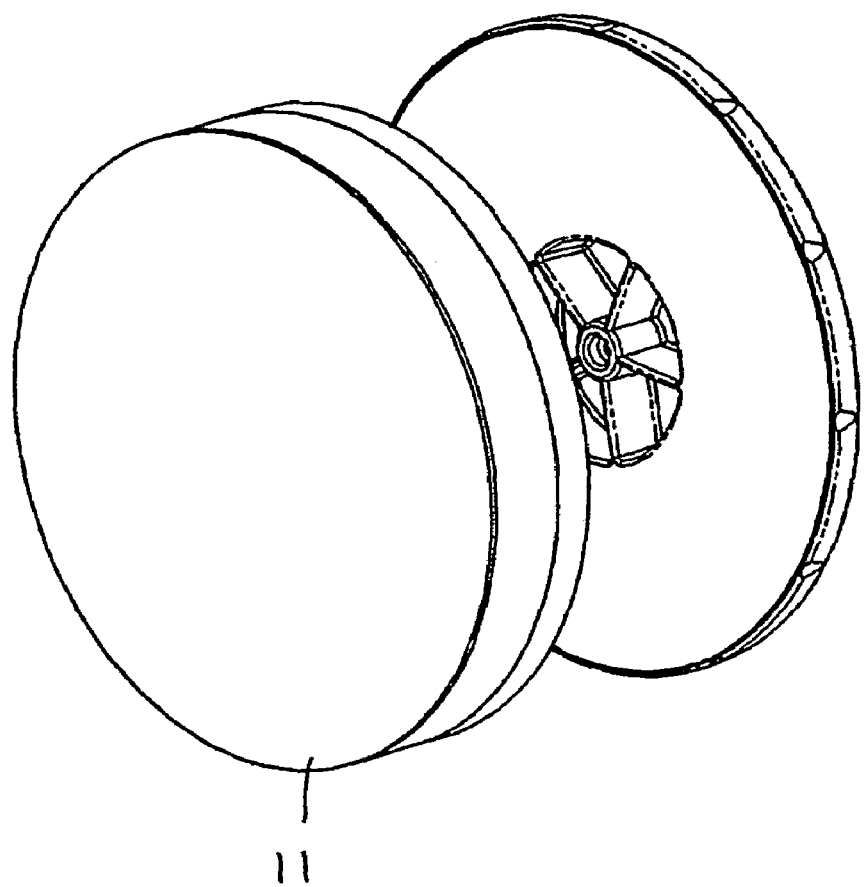
FIG. 6A is a perspective view of an implement for use with the power tool of FIG. 1.
Figure 6B:
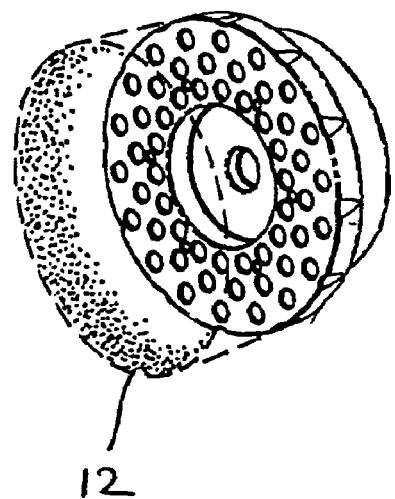
FIG. 6B is a perspective view of another implement for use with the power tool of FIG. 1.

Referring to the drawings, there is shown an electric power hand tool embodying the invention, which in this particular embodiment is a handheld polisher 10 (commonly known as scum buster) typically used for cleaning and publishing car bodies in a wet/soggy or waxy condition. The polisher 10 has a generally pistol-like plastic body 100 having a horizontal barrel 110 (as shown) that houses an electric motor 200 and including a depending handgrip 120 that holds a rechargeable battery 300. A plastic turning hand knob 130 is provided on the rear end of the barrel 110 so that the body 100 can be held firmly by both hands gripping the handgrip 120 and the knob 130.

The motor 200 is held co-axially inside a horizontally extending plastic capsule 400. The capsule 400 has a closed-ended rear portion 410 of a relatively smaller diameter locating the motor 200 and includes an expanded open-ended front portion 420 locating a speed-reduction gearbox 220 together with an aluminum bracket 240 that is a thermal conductor. The gearbox 200 is coupled with a shaft 210 of the motor 200 and includes an output socket 260 (at the end of a shaft) for connecting and driving a variety of cleaning and polishing implements, such as a brush 11, a piece of sponge 12 and a sheet of sander paper, with the use of an adaptor wherever necessary.

The capsule 400 is closed by an aluminum end cap 430 which is thermally conductive and is secured by screws across the open end of the capsule front portion 420 to thereby seal off the capsule 400 with an O-ring 431. The output socket 260 extends outwards from inside the capsule 400 through a tubular central portion 432 of the end cap 430, which supports the socket 260 for rotation with the use of an O-ring 433 for sealing and a thrust race 434 for support.

Given that the polisher 10 is intended for use in a wet condition, the capsule 400 with end cap 430 serves to act as a sealed enclosure enclosing the motor 200 and gearbox 220, etc. to protect them from water or liquid in general as well as dust for example. Sealing means for other electrical components are used wherever necessary. The capsule 400 is located in the barrel 110, with the end cap 430 situated foremost beyond the front end thereof.

Inside the capsule 400, the motor 200 is connected by a pair of cables 201 via a pushbutton switch 204 to the battery 300 for power. The switch 204 is located in the front capsule portion 420 at its junction 415 with the rear portion 410. The cables 201 run from the motor 200 to the switch 204 and then out of the front portion 420 through a port 202 at the junction 415. A silicon tube 203 leading from the port 202 to the battery 300 acts as a waterproof passage for the cables 201 to reach the battery 300. The switch 204 includes a button 205 which protrudes from the junction 415, while being protected by a waterproof cap 206, for pressing by a spring-loaded trigger 207 via a hinged lever 208 to operate the switch 204.

The gearbox 220 includes a gear shift pin 221 for changing the output speed, which is operated by a sliding knob 225 on the barrel 110 adjacent the hand knob 130. The shift pin 221 extends out of the capsule 400 at the junction 415 through a concertina sleeve 222 for waterproof protection, and is then engaged by the sliding knob 225 for operation thereby.

The handgrip 120 has a hinged bottom lid 122 that sealingly closes its interior containing the battery 300. The battery 300 is connected by a pair of contact springs 302, to which the cables 201 from the power switch 204 are connected.

The bracket 240 is of a rectangular U-shaped cross-section, having a flat circular central panel 241 and a pair of side limbs 242 extending from opposite left and right sides of the panel 241. The motor 200 has a metal casing 211 including a flat front end wall 212 which has two screw holes 213 and four vent holes 214 and through which the motor shaft 210 projects out. The bracket panel 241 has holes 243 and 244 matching with those holes 213 and 214 and includes a central hole 245. The bracket 240 is attached with its central panel 241 lying flat against and in surface contact with the front end wall 212 of the motor 200, with its central hole 245 accommodating the motor shaft 210, such that bracket 240 is in thermal contact with motor casing 211.

The bracket holes 243 are aligned with the corresponding motor screw holes 213, through which respective screws 251 are tightened to secure the bracket 240 to the motor 200. The bracket holes 244 are aligned with the motor vent holes 214 to ensure that the latter remain exposed for venting.

The side limbs 242 of the bracket 240 have respective free ends which extend straight to reach the end cap 430 and are folded inwardly each having two holes 246. The end cap 430 has on its inner surface four blind holes aligned with the bracket end holes 246, through which respective screws 252 are used to secure the bracket 240 and end cap 430 together such that they are in thermal contact with each other. The gearbox 220 is located in the bracket 240 and flanked by opposite side limbs 242 thereof, and is fixed in position by the end cap 430 upon connection of the end cap 430 to the bracket limbs 242.

The bracket 240 acts as an internal heat sink for conducting heat from the motor 200 inside the capsule 400 to the end cap 430. The end cap 430 acts as an external heat sink for in turn conducting the motor heat out of the capsule 400 to thereby dissipate heat to the exterior outside the barrel 110. As the end cap 430 is exposed at the front end of the power tool 10, precisely at which position a cleaning/polishing implement 11/12 is to be attached for operation with liquid (detergent or wax), such liquid can readily come into contact with the end cap 430 to enhance heat dissipation.

The bracket 240 and end cap 430 together acts as a heat sink that conducts heat from the motor 200 within the enclosure 400/430 and then dissipates the heat out of the enclosure 400/430 by the end cap 430 being part thereof. For dissipating heat to the external environment, the end cap 430 should be situated at least at an outer surface of the power tool body 100, which in this particular embodiment occupies the front end opening of the body 100. The efficiency of heat dissipation will be increased if the capsule 400 is also made of a heat sink material.

The heat sink 240/430 may be made of any other high thermal conductivity material, whether it be metal or non-metal such as ceramic, for direct contact with the motor 200, and may be made in any shape, configuration and/or dimension, with or without cooling fins.

The electric polisher 10 as described is made to be waterproof to one meter deep in water, but it is to be understood that the power tool of the subject invention may be made to be splash-proof only for a lower level of waterproof requirement.

The invention has been given by way of example only, and various other modifications and/or variations to the described embodiments may be made by persons skilled in the art without departing from the scope of the invention as specified in the accompanying claims.

What is claimed is:

1. A power hand tool comprising:
   a body;
   an electric motor located in the body and having a shaft for driving a connector for connecting and driving an implement, the motor having a metal motor casing;
   an enclosure located within the body and having an open end, wherein the motor is disposed within the enclosure;
   a thermally conductive enclosure part engaging and enclosing the open end of the enclosure, protecting the motor against intrusion of a liquid, the enclosure part being exposed outside of the body; and
   a thermal conductor within the enclosure and having a central part in contact with the metal motor casing and opposed side parts in contact with the enclosure part for conducting heat from the motor to the enclosure part for heat dissipation.

2. The power hand tool as claimed in claim 1, wherein the enclosure part is situated outside the body.

3. The power hand tool as claimed in claim 1, wherein the enclosure part is positioned in close proximity to the connector.

4. The power hand tool as claimed in claim 3, wherein the enclosure part has an apertured portion through which the connector extends from inside the enclosure.

5. The power hand tool as claimed in claim 4, wherein the apertured portion is tubular and supports the connector for rotation.

6. The power hand tool as claimed in claim 1, wherein the thermal conductor is in surface contact with an end wall of the metal motor casing through which the motor shaft projects.

7. The power hand tool as claimed in claim 1, wherein the thermal conductor is secured by screws to the metal motor casing.

8. The power hand tool as claimed in claim 1, wherein the thermal conductor is secured by screws to the enclosure part.

9. The power hand tool as claimed in claim 1, including a gearbox connecting the motor shaft to the connector, the gearbox being flanked by the opposed side parts of the thermal conductor.

10. The power hand tool as claimed in claim 1, wherein the enclosure is a generally tubular unitary body having a substantially closed end opposite the open end.

11. The power hand tool as claimed in claim 10, wherein the enclosure is a plastic.

12. The power hand tool as claimed in claim 1, wherein the enclosure is a plastic.

* * * * *